US012671021B2

(12) United States Patent
Dakiishi

(10) Patent No.: US 12,671,021 B2
(45) Date of Patent: Jun. 30, 2026

(54) ELECTROMAGNETIC ACTUATOR

(71) Applicant: MIKUNI CORPORATION, Tokyo (JP)

(72) Inventor: Ryosuke Dakiishi, Iwate (JP)

(73) Assignee: MIKUNI CORPORATION, Tokyo (JP)

( * ) Notice: Subject to any disclaimer, the term of this patent is extended or adjusted under 35 U.S.C. 154(b) by 339 days.

(21) Appl. No.: 18/312,588

(22) Filed: May 4, 2023

(65) Prior Publication Data

US 2024/0006107 A1 Jan. 4, 2024

(30) Foreign Application Priority Data

Jul. 4, 2022 (JP) ................................ 2022-107773

(51) Int. Cl.
*H01F 7/121* (2006.01)
*H01F 7/16* (2006.01)

(52) U.S. Cl.
CPC ........... *H01F 7/121* (2013.01); *H01F 7/1607* (2013.01)

(58) Field of Classification Search
CPC ........ H01F 7/121; H01F 7/1607; H01F 7/088; H01F 2007/085; H01F 7/127; H01F 7/066; H01F 7/081; H01F 7/126
USPC .......................................................... 335/255
See application file for complete search history.

(56) References Cited

U.S. PATENT DOCUMENTS 4,905,961 A * 3/1990 Ichihashi .............. F16K 31/406 335/262
5,053,735 A * 10/1991 Ohishi ................... H01H 89/08 335/14
5,188,073 A * 2/1993 Ejiri ........................ F02M 3/075 251/318
5,722,367 A * 3/1998 Izydorek .................. F02M 3/09 251/30.03
2024/0379268 A1* 11/2024 Oomori ................. H01F 7/1607
2024/0379269 A1* 11/2024 Sasaki ...................... H01F 7/081
2024/0380297 A1* 11/2024 Ogasawara ............ H02K 41/02
2024/0380298 A1* 11/2024 Kudo ...................... H02K 33/02

FOREIGN PATENT DOCUMENTS

JP 6444485 12/2018
JP 6444485 B2 * 12/2018 ......... F16K 31/0696

OTHER PUBLICATIONS

English Translation JP6444485.*

* cited by examiner

*Primary Examiner* — Shawki S Ismail
*Assistant Examiner* — Lisa N Homza
(74) *Attorney, Agent, or Firm* — JCIPRNET

(57) ABSTRACT

An electromagnetic actuator includes a stator, a coil for excitation, a mover, a shaft of a single outer diameter, and a buffer unit. The mover moves in a predetermined axis direction to move to an actuation position due to energization of the coil and return to a rest position due to non-energization of the coil. The shaft is fixed to the mover and exerts a driving force to outside. The buffer unit is held at the mover and positions the mover at the rest position while absorbing impact when the mover returns to the rest position. The buffer unit includes: a rod abutting against the stator at the rest position; a biasing member biasing the rod toward the stator; and a buffer member interposed between the rod and the shaft. The mover includes a fitting hole into which the shaft is fitted and a receiving part receiving the biasing member.

11 Claims, 16 Drawing Sheets

ELECTROMAGNETIC ACTUATOR

CROSS-REFERENCE TO RELATED APPLICATION

This application claims the priority benefit of Japan application serial no. 2022-107773, filed on Jul. 4, 2022. The entirety of the above-mentioned patent application is hereby incorporated by reference herein and made a part of this specification.

BACKGROUND

Technical Field

The disclosure relates to an electromagnetic actuator using an electromagnetic force of a solenoid as a driving force, and more particularly, to an electromagnetic actuator including a shaft fixed to a mover that moves linearly back and forth and moves outward upon energization.

Related Art

As a conventional electromagnetic actuator, an electromagnetic solenoid has been disclosed to include a stator (fixed part and plunger guide part), a coil for excitation arranged around the stator, a mover (movable yoke) that is reciprocatingly arranged inside the stator, a shaft (plunger) fixed to the mover, and an impact absorption means that is accommodated in the mover to absorb impact when the mover collides with a fixed part of the stator. The impact absorption means includes a receiving member that protrudes from a rear end part of the mover, a spring that is arranged between the receiving member and the shaft to bias the receiving member in a protruding direction, and a buffer material arranged between the receiving member and the shaft (see, for example, Patent Document 1: Japanese Patent Publication No. 6444485).

In the above electromagnetic solenoid, the shaft is formed in a stepped shape including a small-diameter main body part guided by the stator and a large-diameter head part press-fitted into the mover and receiving the spring. Thus, the machining of the shaft is complicated, and simplification of structure and cost reduction are desired. In addition to simplification of structure and cost reduction of the shaft, it is also desired to reduce the cost of the mover, simplify the work of assembling the spring and the buffer material to the mover, and simplify the retaining structure after assembly.

SUMMARY

An electromagnetic actuator according to the disclosure includes a stator, a coil for excitation, a mover, a shaft of a single outer diameter, and a buffer unit. The mover moves in a predetermined axial direction to move to an actuation position due to energization of the coil and return to a rest position due to non-energization of the coil. The shaft is fixed to the mover and exerts a driving force to outside. The buffer unit is held at the mover and positions the mover at the rest position while absorbing impact when the mover returns to the rest position. The buffer unit includes: a rod which abuts against the stator at the rest position; a biasing member which biases the rod toward the stator; and a buffer member which is interposed between the rod and the shaft. The mover includes a fitting hole into which the shaft is fitted and a receiving part which receives the biasing member.

In the electromagnetic actuator, the mover may include a restricting part which is crimped to restrict the rod from coming off.

In the electromagnetic actuator, the biasing member may be a compression-type coil spring. The mover may include: a guide inner wall surface which guides the rod slidably in the axial direction; and the receiving part which is formed in an annular shape around the fitting hole.

In the electromagnetic actuator, the biasing member may be a compression-type coil spring. The mover may include: a restricting part which is crimped to restrict the rod from coming off; a guide inner wall surface which guides the rod slidably in the axial direction; and the receiving part which is formed in an annular shape around the fitting hole.

In the electromagnetic actuator, the mover may include a fitting inner wall surface which is formed continuously with an outer edge of the receiving part and into which one end part of the coil spring is fitted.

In the electromagnetic actuator, the shaft may be press-fitted into the fitting hole such that a fixed end part of the shaft protrudes inward from the receiving part in the axial direction.

In the electromagnetic actuator, the mover may be a forged product.

In the electromagnetic actuator, the stator may include a first stator and a second stator. The first stator includes a rest-side stopper part abutting against the rod and accommodates the mover. The second stator includes a through-hole which allows the shaft to pass and exposes a free end part of the shaft.

In the electromagnetic actuator, the first stator may include: a cylindrical part which accommodates the mover in a non-contact manner; a bottom wall part which is continuous with the cylindrical part to define the rest-side stopper part; and a flange part which extends in a radial direction from the cylindrical part. The second stator may include: an inner cylindrical part which defines the through-hole; and an outer cylindrical part which surrounds the coil arranged around the cylindrical part and the inner cylindrical part and fixes the flange part by crimping.

In the electromagnetic actuator, the second stator may include an actuation-side stopper part which receives the mover at the actuation position.

In the electromagnetic actuator, the actuation-side stopper part may be subjected to a hardening treatment.

In the electromagnetic actuator, the actuation-side stopper part may include a guide hole which slidably guides the shaft.

In the electromagnetic actuator, the second stator may include a bearing which is fitted to the through-hole to slidably guide the shaft.

The electromagnetic actuator having the above configuration can achieve simplification of structure, cost reduction, and simplification of assembly work.

DESCRIPTION OF THE EMBODIMENTS

Figure 1:
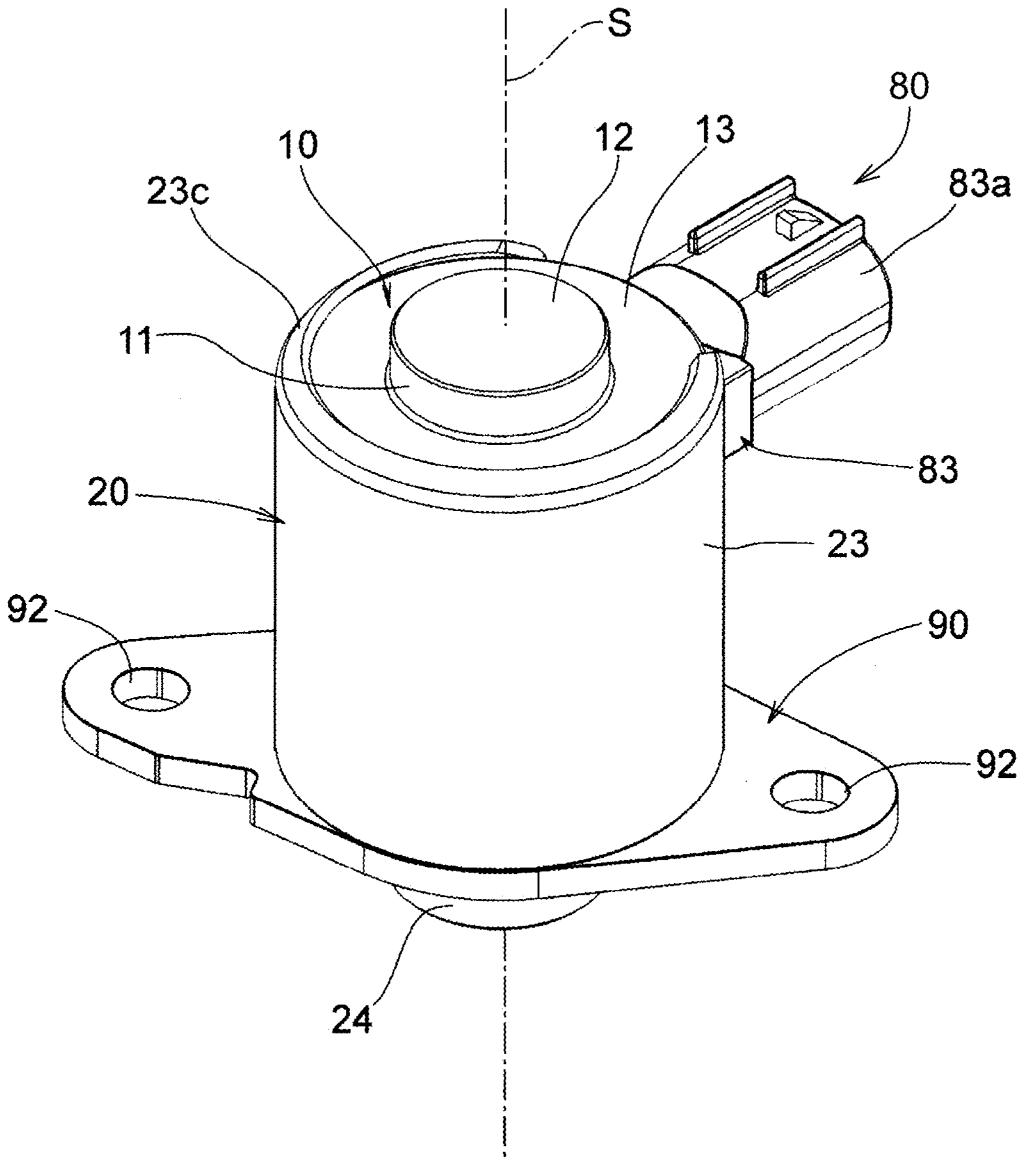
FIG. 1 is an external perspective view showing an electromagnetic actuator according to a first embodiment of the disclosure, as viewed diagonally from one direction.

Embodiments of the disclosure provide an electromagnetic actuator capable of achieving simplification of structure, cost reduction, and simplification of assembly work.

Hereinafter, embodiments of the disclosure will be described with reference to the accompanying drawings. An electromagnetic actuator according to the disclosure is applied to an application target object that exerts a driving force to the outside, such as a cam switching mechanism of an internal combustion engine, an oil path switching valve, or another on/off switching mechanism. As shown in FIG. 1 to FIG. 7, the electromagnetic actuator according to a first embodiment includes a first stator 10 and a second stator 20 as stators, a mover 30, a shaft fixed to the mover 30, a buffer unit U, a coil module 80, a flange member 90, and seal members $Sr_1$, $Sr_2$, and $Sr_1$.

The buffer unit U is held at the mover 30 to position the mover 30 at a rest position while absorbing impact when the mover 30 returns to the rest position. The buffer unit U includes a rod 50, a biasing member 60, and a buffer member 70. The coil module 80 includes a bobbin 81, a coil 82 for excitation, and a molded part 83 in which the bobbin 81 and the coil 82 are embedded.

Figure 3:
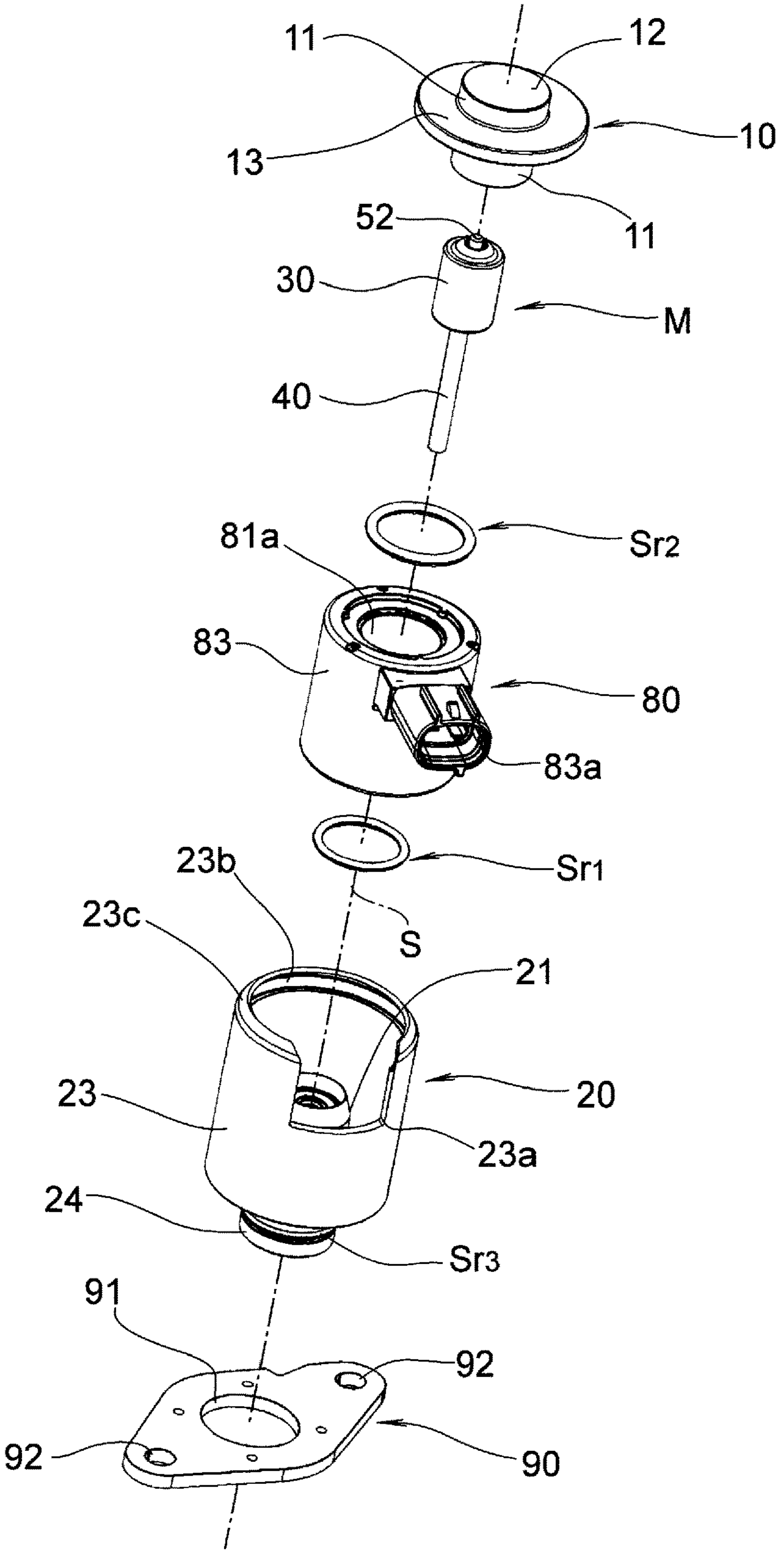
FIG. 3 is an exploded perspective view of the electromagnetic actuator according to the first embodiment.
Figure 4:
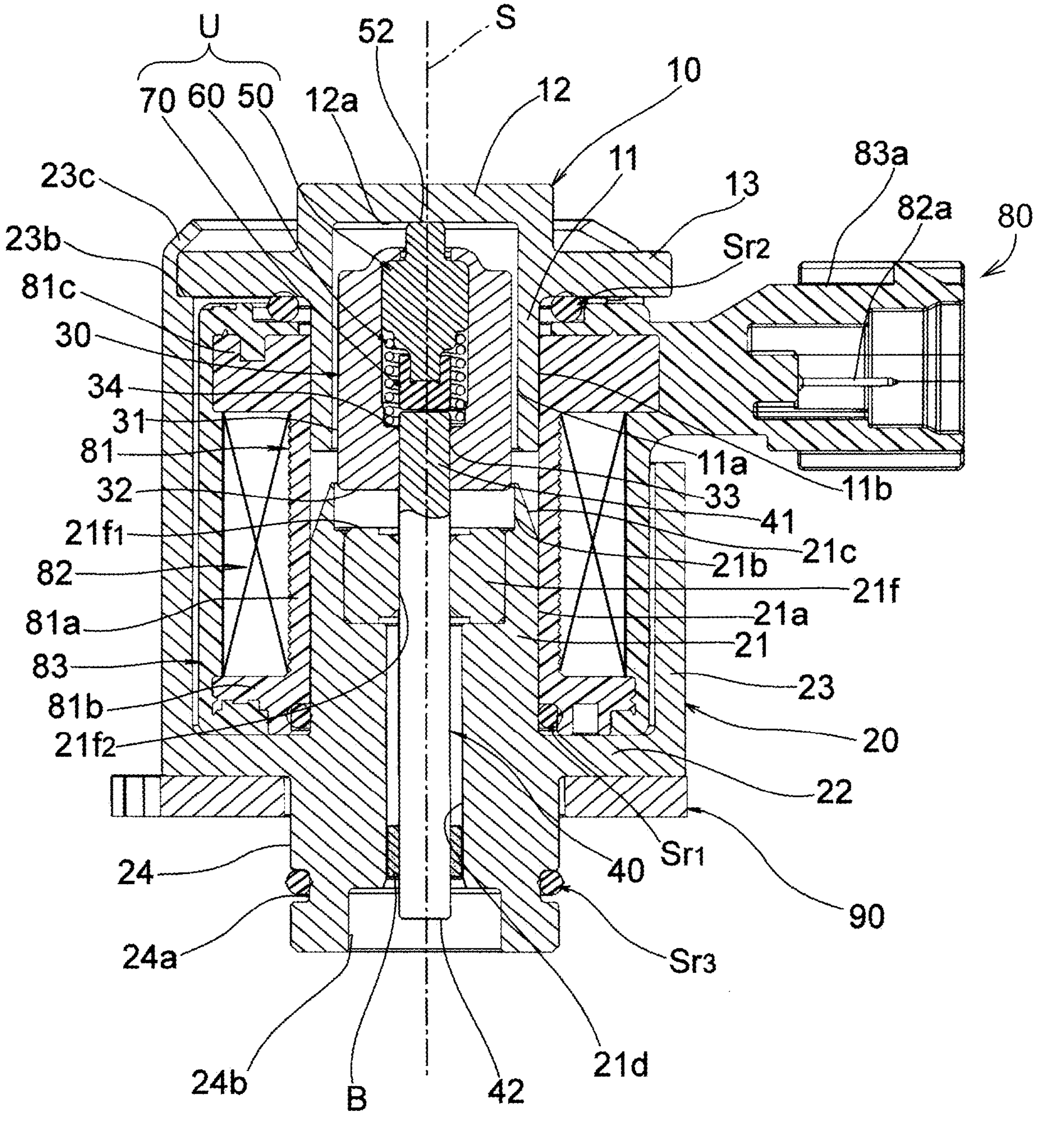
FIG. 4 is a cross-sectional view of the electromagnetic actuator according to the first embodiment.

The first stator 10 functions as a magnetic path that is formed of soft iron or the like by machining or forging and allows a magnetic line of force to pass. As shown in FIG. 1, FIG. 3, and FIG. 4, the first stator 10 includes a cylindrical part 11, a bottom wall part 12, and a flange part 13. The cylindrical part 11 includes an inner peripheral surface 11*a* and an outer peripheral surface 11*b* centered on an axis S to accommodate the mover 30 movably in the axis S direction in a non-contact manner. The inner peripheral surface 11*a* is opposed to an outer peripheral surface 31 of the mover 30 with a predetermined gap (e.g., 0.5 mm to 0.6 mm) present in the radial direction perpendicular to the axis S. The outer peripheral surface 11*b* is in close contact with an inner wall surface of a cylindrical part 81*a* of the bobbin 81. The bottom wall part 12 is formed continuously with the cylindrical part 11 into a circular plate shape perpendicular to the axis S, and covers the mover 30 together with the cylindrical part 11 and defines an inner wall surface 12*a* that functions as a rest-side stopper part against which the rod 50 of the buffer unit U abuts when the mover 30 is positioned at the rest position. The flange part 13 is formed in a ring plate shape extending in a radial direction perpendicular to the axis S from an outer periphery of the cylindrical part 11, and covers the coil module 80 together with the second stator 20 and is fitted to an outer cylindrical part 23 (annular recess 23*b*) of the second stator 20 to be connected and fixed to the second stator 20 by crimping.

The second stator 20 is formed of soft iron or the like by machining or forging, and functions as a magnetic path that allows a magnetic line of force to pass and as a fixed core that attracts the mover 30 upon energization of the coil 82. As shown in FIG. 1, FIG. 3, and FIG. 4, the second stator 20 includes an inner cylindrical part 21, a bottom wall part 22, an outer cylindrical part 23, and a fitting part 24 to be fitted to the application target object.

The inner cylindrical part 21 includes an outer peripheral surface 21*a* and an inner peripheral surface 21*b* centered on the axis S, an outer peripheral annular tapered surface 21*c*, a through-hole 21*d*, and an actuation-side stopper part 21*f*. The outer peripheral surface 21*a* has the same outer diameter as the outer peripheral surface 11*b* of the first stator 10, and is closely fitted into the inner wall surface of the cylindrical part 81*a* of the bobbin 81. The inner peripheral surface 21*b* is formed with an inner diameter larger than that of the outer peripheral surface 31 of the mover 30 to receive, in a non-contact manner, the mover 30 moving to an actuation position. Centered on the axis S, the outer peripheral annular tapered surface 21*c* is formed in a conical shape tapered toward the cylindrical part 11 of the first stator 10. The outer peripheral annular tapered surface 21*c* serves to guide a magnetic line of force generated upon energization of the coil 82 to pass from the cylindrical part 11 via the mover 30 and then in the axis S direction within the inner cylindrical part 21 in a streamlined manner. The through-hole 21*d* is centered on the axis S and is formed to allow the shaft 40 to pass in a non-contact manner and expose a free end part 42 of the shaft 40. Further, as shown in FIG. 4, a bearing B that guides the shaft 40 slidably in the axis S direction is fitted to the through-hole 21*d*. The bearing B is a bush formed of a hard metal material into a cylindrical shape, and is arranged in a region supporting the vicinity of the free end part 42 side of the shaft 40 in the through-hole 21*d* of the second stator 20. The actuation-side stopper part 21*f* is formed as a separate member subjected to a hardening treatment such as carburizing and is then fitted and fixed. The actuation-side stopper part 21*f* defines a stopper surface 21$f_1$ against which an end surface 32 of the mover 30 abuts, and a guide hole 21$f_2$ that guides the shaft 40 slidably in the axis S direction. Accordingly, by adopting the actuation-side stopper part 21*f* subjected to the hardening treatment, it is possible to enhance wear resistance and mechanical strength against impact of the mover 30 as compared to the case of being formed of a material such as soft iron. In addition, the cost can be reduced as compared to the case of applying a hardening treatment to the entire second stator 20.

The bottom wall part 22 is formed continuously with the inner cylindrical part 21 into a ring plate shape perpendicular to the axis S, and connects the inner cylindrical part 21 and the outer cylindrical part 23. The bottom wall part 22 covers the coil module 80 together with the inner cylindrical part 21 and the outer cylindrical part 23, and the flange member 90 is welded to an outer wall surface of the bottom wall part 22.

The outer cylindrical part 23 extends in the axis S direction from an outer edge of the bottom wall part 22 and is formed concentrically with the inner cylindrical part 21 around the axis S. The outer cylindrical part 23 includes a notch 23*a*, an annular recess 23*b*, and a crimping part 23*c*. The notch 23*a* is formed in a rectangular shape to expose a part (connector 83*a*) of the coil module 80. The annular recess 23*b* is formed to abut against the flange part 13 of the first stator in the axis S direction and position the flange part 13 in a radial direction perpendicular to the axis S. The crimping part 23*c* is formed to fix the flange part 13 fitted into the annular recess 23*b* by crimping.

The fitting part 24 is formed to be fitted to a fitting recess of the application target object. The fitting part 24 includes, on an outer peripheral surface thereof, an annular groove 24*a* into which the seal member $Sr_3$ is fitted, and includes, on an inner side thereof, a recess 24*b* having an inner diameter larger than the through-hole 21*d*.

Figure 5:
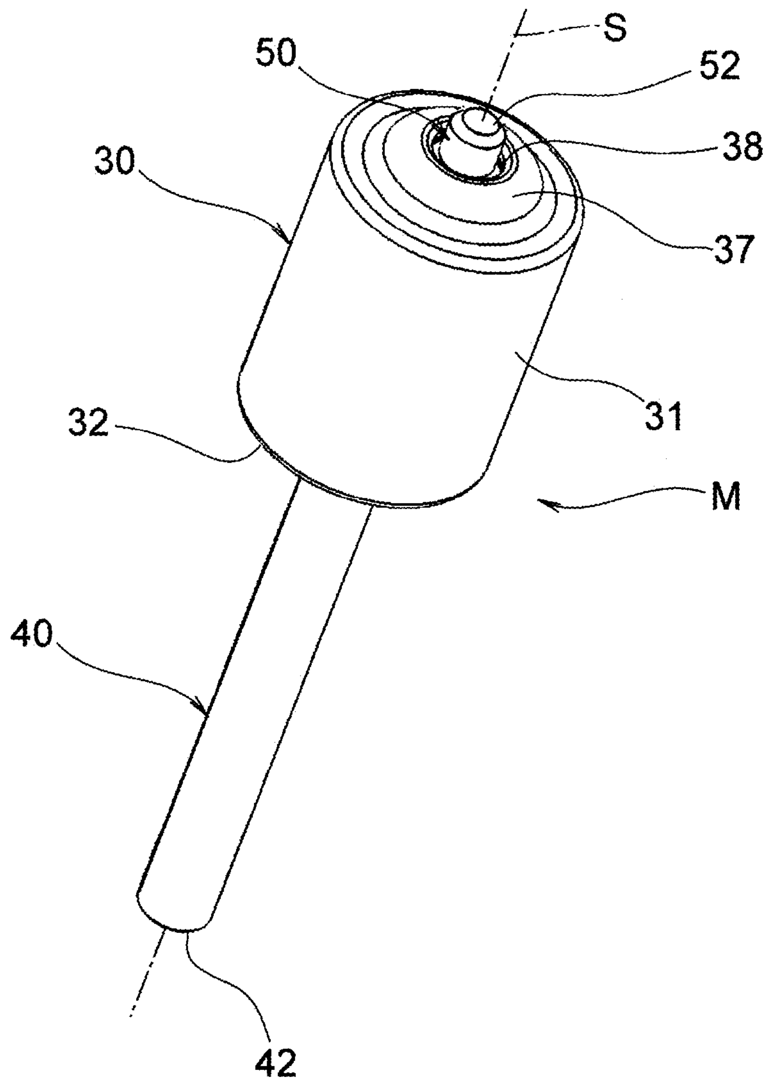
FIG. 5 is an external perspective view showing a mover and a shaft in the electromagnetic actuator according to the first embodiment.
Figure 6:
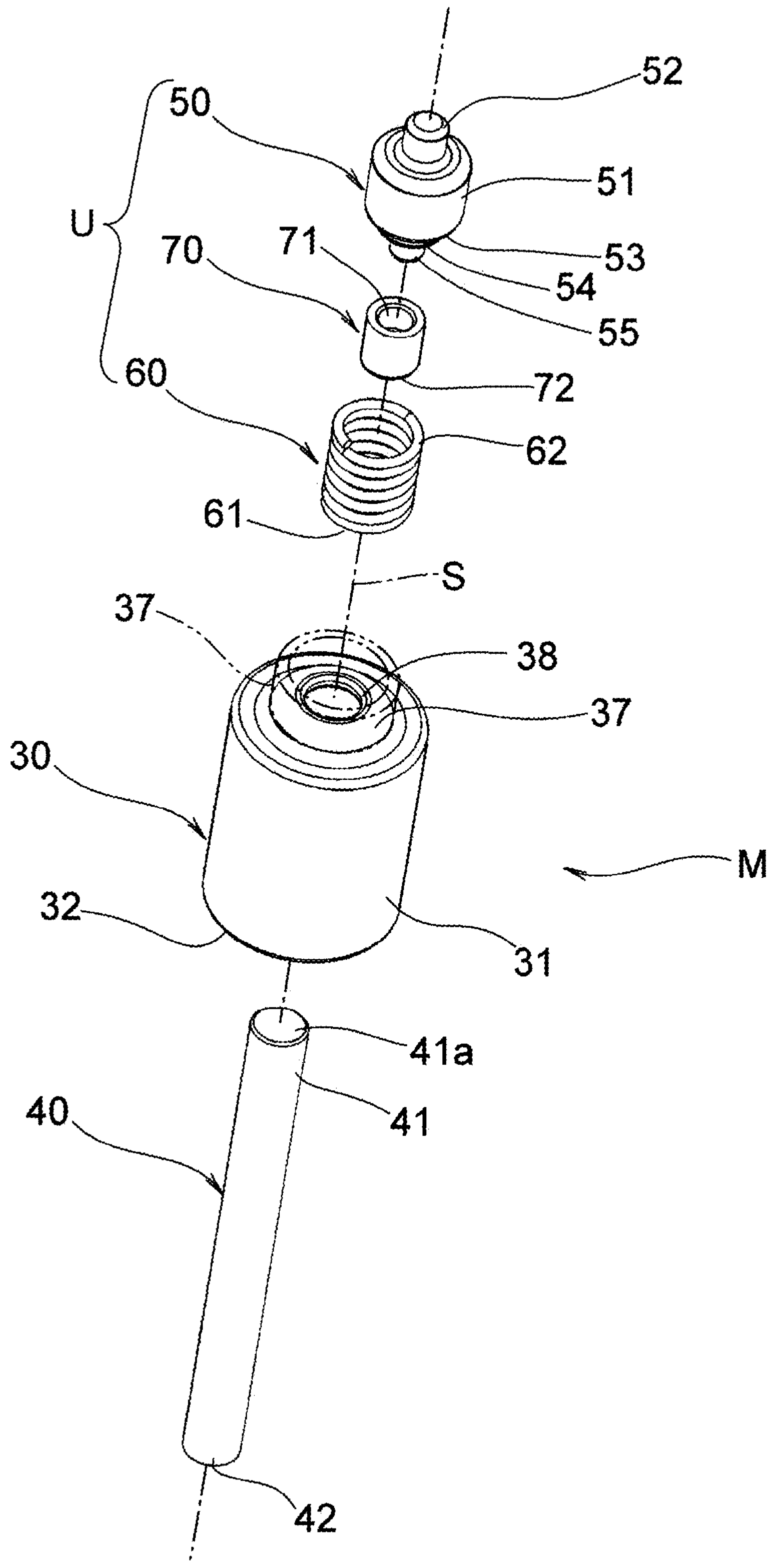
FIG. 6 is an exploded perspective view of the mover, a buffer unit accommodated in the mover, and the shaft in the electromagnetic actuator according to the first embodiment.
Figure 7:
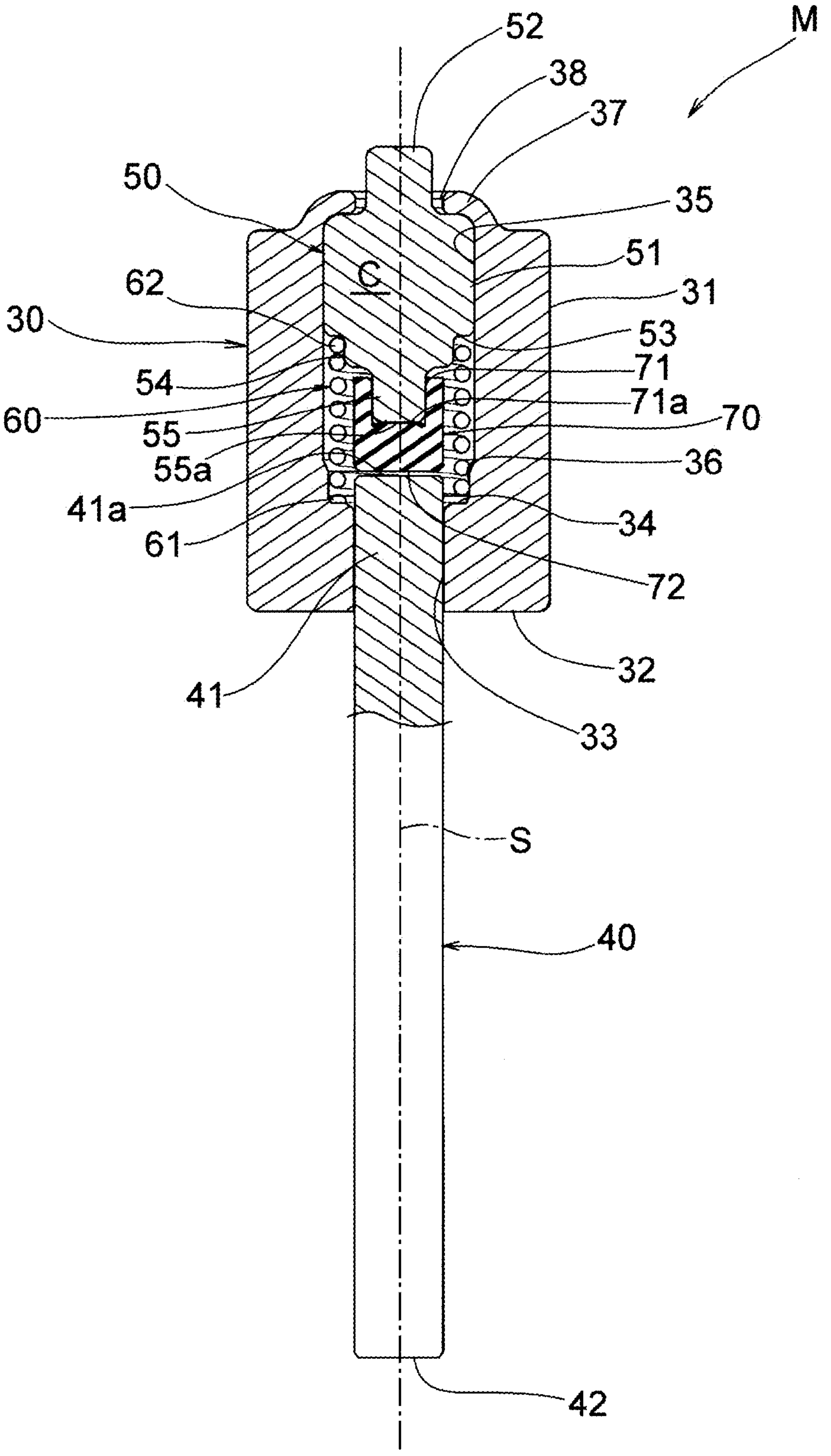
FIG. 7 is a cross-sectional view of the mover accommodating a buffer unit and the shaft in the electromagnetic actuator according to the first embodiment.

The mover 30 functions as a magnetic path that allows a magnetic line of force to pass, and as a movable core that moves in the axis S direction upon energization of the coil 82. The mover 30 is formed of free-cutting steel (SUM) or the like by machining or forging into a bottomed cylindrical shape that defines an accommodating part C accommodating the buffer unit U. As shown in FIG. 5 to FIG. 7, the mover 30 includes an outer peripheral surface 31, an end surface 32, a fitting hole 33, a receiving part 34, a guide inner wall surface 35, a fitting inner wall surface 36, a restricting part 37, and an opening 38.

The outer peripheral surface 31 is a cylindrical surface centered on the axis S and is opposed to the inner peripheral surface 11*a* of the first stator 10 with a predetermined gap present therebetween. The end surface 32 is formed as a plane perpendicular to the axis S and abuts against the actuation-side stopper part 21*f* (stopper surface 21$f_1$) of the second stator 20 at the actuation position. The fitting hole 33 has a circular cross section centered on the axis S and is a region into which a fixed end part 41 of the shaft 40 is press-fitted, and the fitting hole 33 is formed with an inner diameter that is slightly smaller than the outer diameter dimension of the shaft 40 and a length dimension in the axis S direction that is larger than the outer diameter dimension of the shaft 40.

The receiving part 34 receives one end part 61 of the biasing member 60 in the axis S direction, and is formed as a ring-shaped plane centered on the axis S and perpendicular to the axis S around the fitting hole 33. The guide inner wall surface 35 is formed as a cylindrical surface centered on the axis S to guide the rod 50 slidably in the axis S direction. The fitting inner wall surface 36 is formed continuously with an outer edge of the receiving part 34 and has a diameter slightly smaller than the guide inner wall surface 35 to position the one end part 61 of the biasing member 60 in the direction perpendicular to the axis S.

The restricting part 37 is formed in a thin cylindrical shape as indicated by a double-dot dashed line in FIG. 6 on the opening end side of the accommodating part C, and after accommodating the buffer unit U in the accommodating part C, the restricting part 37 is crimped as indicated by a solid line to restrict the rod 50 from coming off. The opening 38 is formed as a circular hole centered on the axis S to allow a protruding part 52 of the rod 50 to protrude to the outside.

Herein, as a forged product, the mover 30 can be manufactured at a lower cost as compared to a machined product. In addition, by arranging the mover 30 in a non-contact manner with a gap present with respect to the inner peripheral surface 11*a* of the cylindrical part 11 of the first stator 10, mutual attraction can be suppressed or prevented upon energization of the coil 82, and smooth movement with excellent responsiveness due to attraction with the second stator 20 can be obtained.

The shaft 40 applies a driving force to the application target object, is formed of stainless steel or the like into a columnar shape having a single outer diameter (e.g., about 4 mm) with a long length in the axis S direction, and includes a fixed end part 41 and a free end part 42. The fixed end part 41 is a region fixed to the mover 30 and is press-fitted into the fitting hole 33 such that an end surface 41*a* protrudes inward (into the accommodating part C) from the receiving part 34 in the axis S direction. The free end part 42 is arranged to protrude outward from the through-hole 21*d* of the second stator 20 at the rest position.

Then, the shaft 40 is guided slidably in the axis S direction by the guide hole 21$f_2$ and the bearing B provided at the second stator 20. Accordingly, since the shaft 40 is formed as a shaft having a single outer diameter instead of a stepped shaft as in the conventional case, the structure can be simplified and the manufacturing cost can be reduced.

The rod 50 is formed of stainless steel or the like, and as shown in FIG. 4, FIG. 6, and FIG. 7, the rod 50 includes a main body part 51, a protruding part 52, a receiving part 53, a positioning part 54, and a fitting part 55. The main body part 51 is formed in a columnar shape centered on the axis S direction to slidably contact the guide inner wall surface 35 of the mover 30. The protruding part 52 is formed in a columnar shape that is centered on the axis S direction and has a diameter smaller than that of the main body part 51 to protrude from the opening 38 of the mover 30 and be capable of releasably abutting against a rest-side stopper part (inner wall surface 12*a*) of the first stator 10.

The receiving part 53 is formed as a ring-shaped end surface centered on the axis S to receive another end part 62 of the biasing member 60. The positioning part 54 is formed in a columnar shape that is centered on the axis S and has a diameter smaller than that of the main body part 51 to be fitted on the inner side of the biasing member 60 to position the biasing member in a direction perpendicular to the axis S. The fitting part 55 is formed in a columnar shape that is centered on the axis S and has a diameter smaller than that of the positioning part 54 to be fitted to a fitting recess 71 of the buffer member 70 to position the buffer member 70 in a direction perpendicular to the axis S.

The biasing member 60 is a compression-type coil spring and is arranged to be compressed in the axis S direction, with one end part 61 abutting against the receiving part 34 of the mover 30 and another end part 62 abutting against the receiving part 53 of the rod 50. The biasing member 60 biases the rod 50 to abut against the restricting part 37 in the axis S direction. That is, in the assembled electromagnetic actuator, the biasing member 60 biases the rod 50 toward the stator (first stator 10). Herein, a biasing force of the biasing member 60 is set to be greater than a return force exerted by the application target object. Accordingly, the biasing member 60 overcomes the return force of the application target object and positions the mover 30 at a predetermined rest position.

The buffer member 70 is formed of a material capable of absorbing impact such as a rubber material or the like into a columnar shape having an outer diameter equal to the outer diameter of the shaft 40, and as shown in FIG. 4, FIG. 6, and FIG. 7, the buffer member 70 includes a fitting recess 71 and an end surface 72. The fitting recess 71 is formed such that the fitting part of the rod 50 is fitted thereto and an end surface 55*a* of the fitting part 55 abuts against a bottom surface 71*a* of the fitting recess 71. With the fitting part 55 fitted to the fitting recess 71 in this manner to assemble the buffer member 70 to the rod 50 in advance, the assembly work can be easily performed by inserting together with the rod 50 into the accommodating part C of the mover 30. In addition, the buffer member 70 can be positioned in a direction perpendicular to the axis S, and interference with the biasing member 60 can be prevented. The end surface 72 is formed as a plane perpendicular to the axis S and is arranged to oppose to the end surface 41*a* of the shaft 40.

Then, in the assembled state, the buffer member 70 is arranged such that a slight gap is formed between the end surface 72 and the end surface 41*a* in the rest state in which the mover 30 is positioned at the rest position. This gap serves to absorb dimensional errors in manufacturing of the buffer member 70 or other members, and the desired buffer effect can be obtained by preventing the buffer member 70 from being compressed in the rest state. That is, the buffer member 70 is arranged to be interposed between the rod 50 and the shaft 40 in the axis S direction.

As described above, the coil module 80 includes the bobbin 81, the coil 82 for excitation, and the molded part 83. The bobbin 81 is formed of a resin material and, as shown in FIG. 4, includes a cylindrical part 81*a* centered on the axis S, a flange part 81*b*, and a flange part 81*c*. The cylindrical part 11 of the first stator 10 and the inner cylindrical part 21 of the second stator are fitted on the inner side of the cylindrical part 81*a*, and the coil 82 is wound on the outer side of the cylindrical part 81*a*. The flange part 81*b* is formed in a ring plate shape centered on the axis S and is arranged to oppose to the bottom wall part 22 of the second stator 20. The flange part 81*c* is formed in a ring plate shape centered on the axis S and is arranged to oppose to the flange part 13 of the first stator 10.

The coil 82 serves for excitation which generates magnetic force by energization, is wound around the cylindrical part 81*a* of the bobbin 81, and is connected to two terminals 82*a*. The molded part 83 is molded using a resin material and is formed such that, with the coil 82 wound around the bobbin 81 and the terminal 82*a* connected, the molded part 83 covers the entirety and exposes the terminal 82*a* in the connector 83*a*.

Figure 2:
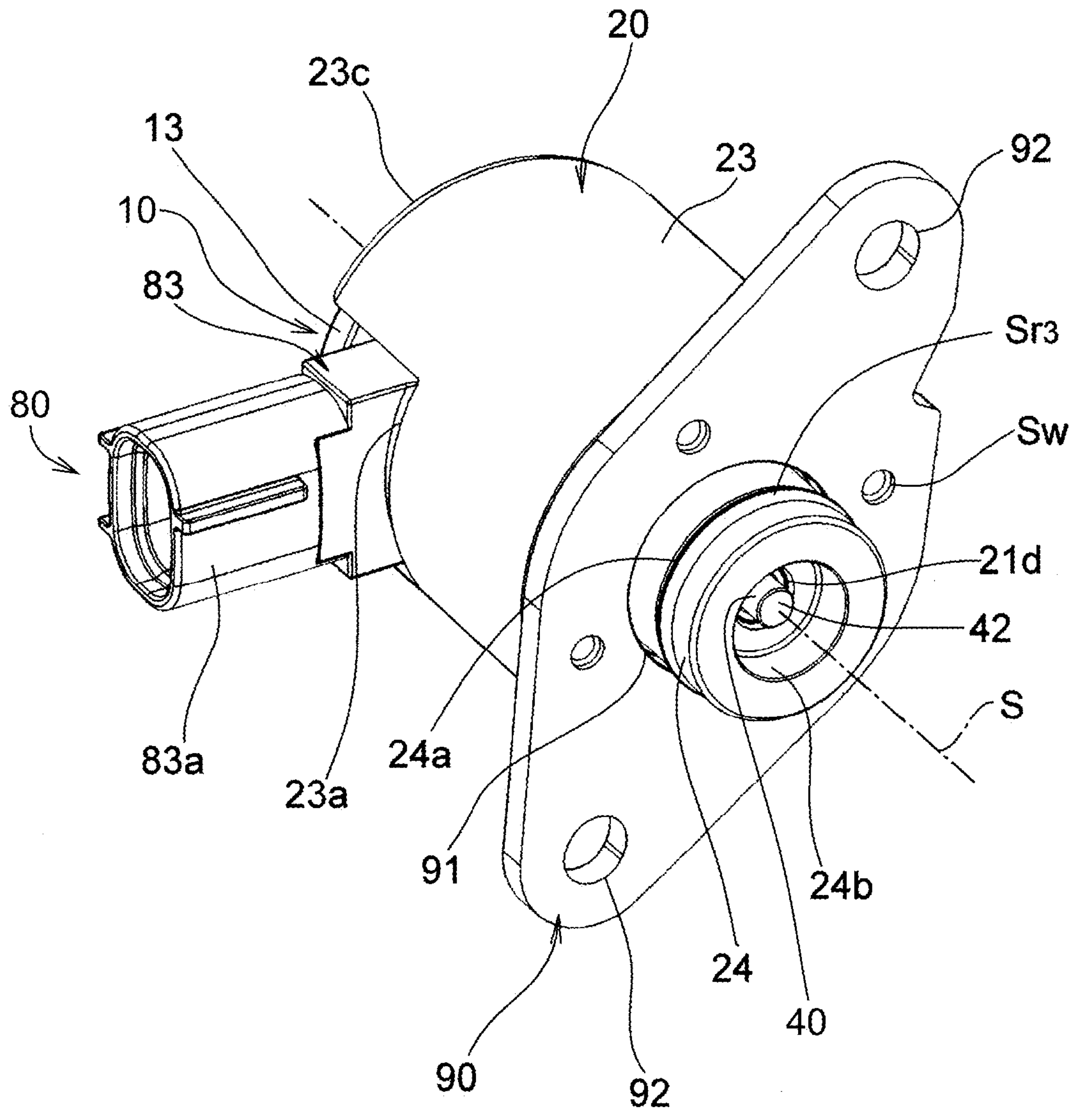
FIG. 2 is an external perspective view showing the electromagnetic actuator according to the first embodiment, as viewed from another direction (a side attached to an application target object).

The flange member 90 serves for attaching to the application target object and is formed of a metal plate such as stainless steel to have a substantially rhombic outline. As shown in FIG. 1 to FIG. 3, the flange member 90 includes a central hole 91 through which the fitting part 24 of the second stator 20 is inserted, and two circular holes 92 that allow fastening bolts (or screws) to pass. Then, with the fitting part 24 passed through the central hole 91, as shown in FIG. 2, the flange member 90 is fixed to the second stator 20 by performing spot welding Sw (e.g., at four locations) on the outer wall surface of the bottom wall part 22 of the second stator 20.

Figure 8:
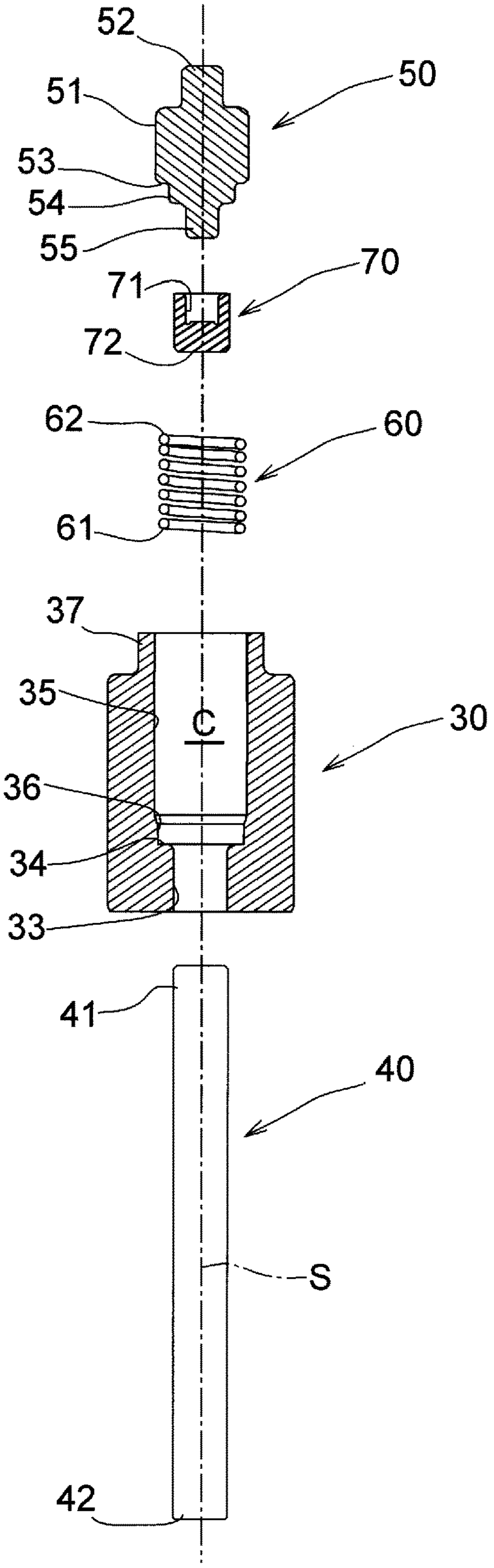
FIG. 8 is process view illustrating assembly work of the mover, the buffer unit, and the shaft in the electromagnetic actuator according to the first embodiment.

Next, the assembly work of the electromagnetic actuator will be described with reference to FIG. 3 and FIG. 8 to FIG. 12. First, in a subline, as shown in FIG. 8, the mover 30, the shaft and the buffer unit U (the rod 50, the biasing member 60, and the buffer member 70) are prepared to form a mover module M by assembling the shaft 40 and the buffer unit U to the mover 30.

Figure 9:
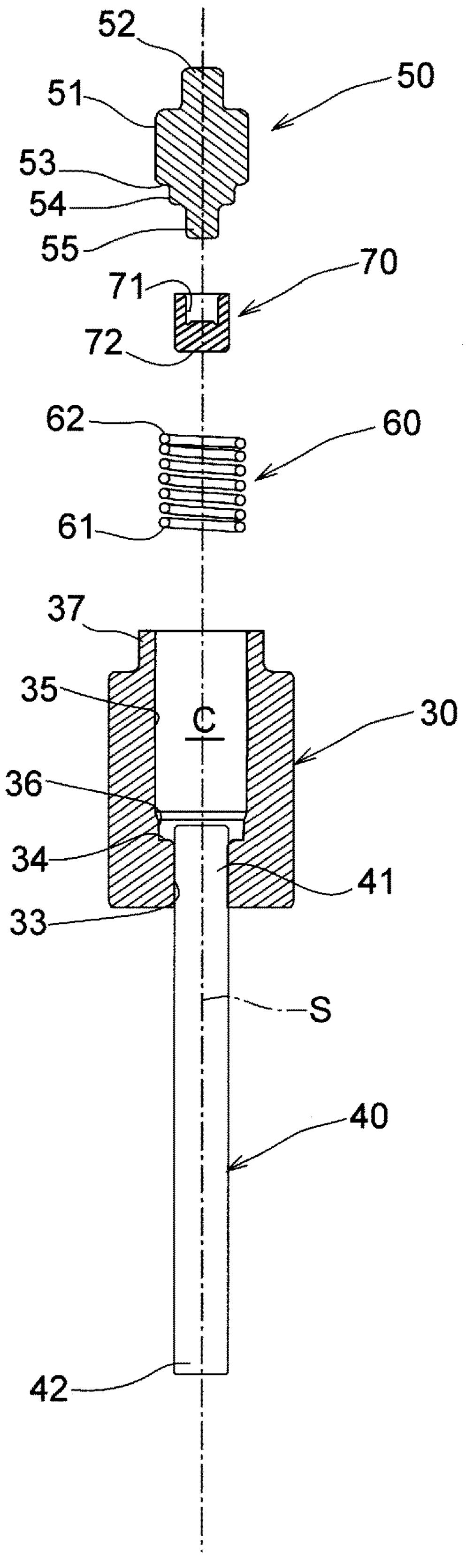
FIG. 9 is a process view illustrating assembly work of the mover, the buffer unit, and the shaft in the electromagnetic actuator according to the first embodiment.
Figure 10:
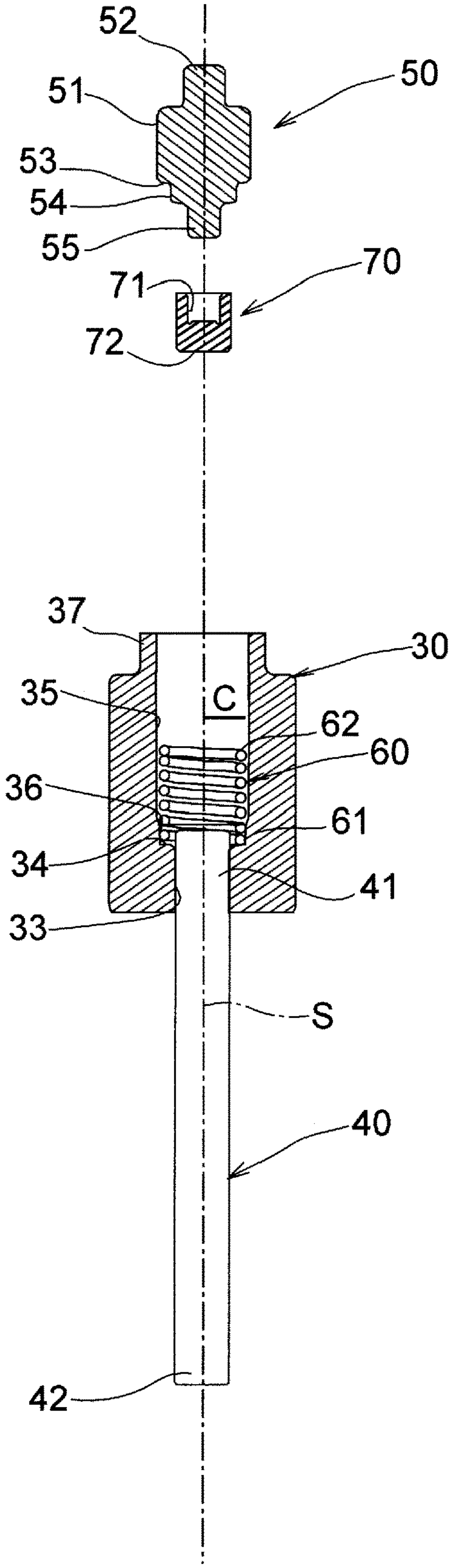
FIG. 10 is a process view illustrating assembly work of the mover, the buffer unit, and the shaft in the electromagnetic actuator according to the first embodiment.
Figure 11:
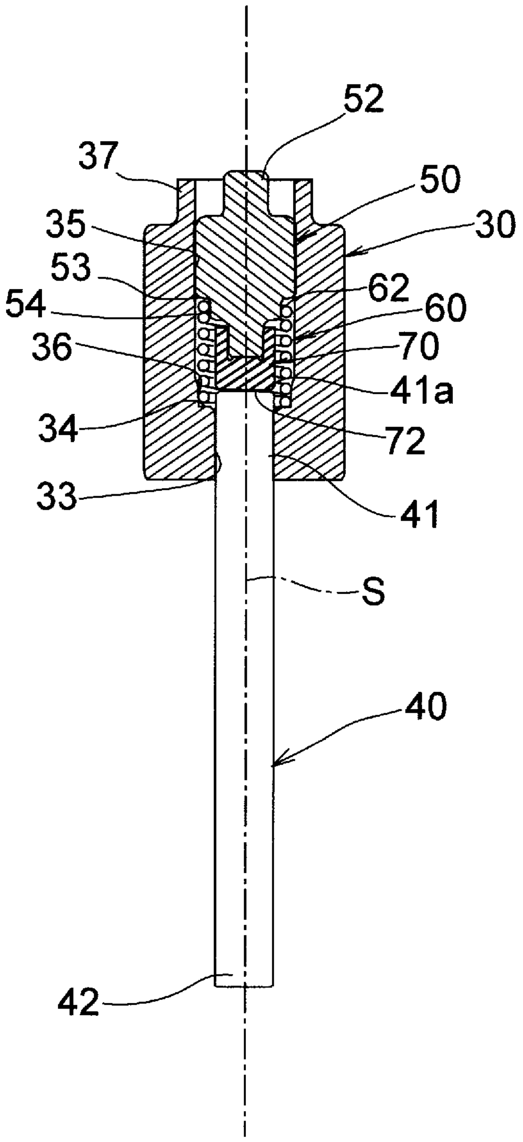
FIG. 11 is a process view illustrating assembly work of the mover, the buffer unit, and the shaft in the electromagnetic actuator according to the first embodiment.

Subsequently, as shown in FIG. 9, the fixed end part 41 of the shaft 40 is press-fitted into the fitting hole 33 of the mover 30. Subsequently, as shown in FIG. 10, the biasing member 60 is inserted into the accommodating part C of the mover 30, and the one end part 61 is fitted into the fitting inner wall surface 36 and abuts against the receiving part 34. Subsequently, as shown in FIG. 11, with the buffer member 70 attached to the rod 50, the buffer member 70 and the rod 50 are inserted into the accommodating part C. Then, the end surface 72 of the buffer member 70 is abutted against the end surface 41*a* of the shaft 40, the positioning part 54 of the rod 50 is fitted into the another end part 62 of the biasing member 60, and the receiving part 53 is abutted against the another end part 62.

Figure 12:
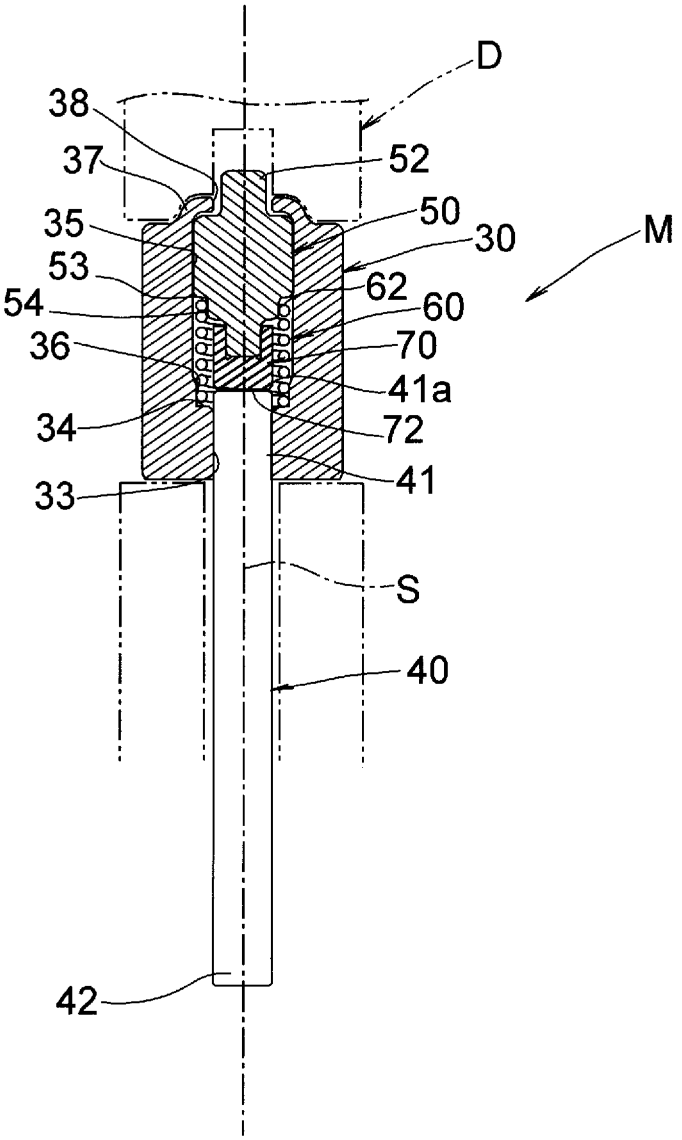
FIG. 12 is a process view illustrating assembly work of the mover, the buffer unit, and the shaft in the electromagnetic actuator according to the first embodiment.

Subsequently, as shown in FIG. 12, with the rod 50 pushed in the axis S direction, the restricting part 37 of the mover 30 is crimped using a crimping device D. With the above processes, the assembly of the shaft 40 and the buffer unit U (the rod 50, the biasing member 60, and the buffer member 70) to the mover 30 is completed, and the mover module M is formed. Nonetheless, the above processes and sequence are merely an example, and the shaft 40 may also be press-fitted in a subsequent process.

In the mover module M removed from the crimping device, as shown in FIG. 5 and FIG. 7, due to the biasing force of the biasing member 60, the protruding part 52 of the rod 50 protrudes outward from the opening 38 of the mover 30, and the main body part 51 abuts against the restricting part 37 of the mover 30. Accordingly, further movement of the rod 50 in the axis S direction is restricted by the restricting part 37, and the rod 50 is held movably in the axis S direction in the accommodating part C of the mover 30 while being biased by the biasing member That is, the buffer unit U is maintained in a state of being held in the accommodating part C of the mover 30.

Next, as shown in FIG. 4, the first stator 10, the second stator 20, the mover module M, the coil module 80, the flange member 90, and the seal members $Sr_1$, $Sr_2$, and $Sr_1$ are prepared. The coil module 80 is prepared in advance by resin-molding the bobbin 81 and the coil 82 with the molded part 83. The second stator 20 is prepared with the bearing B fitted into the through-hole 21*d*.

First, the coil module 80 is assembled to the second stator 20 together with the seal member $Sr_1$. Specifically, the cylindrical part 81*a* of the bobbin 81 is fitted to the inner cylindrical part 21, and the molded part 83 covering the flange part 81*b* is abutted against the bottom wall part 22. Subsequently, the mover module M is assembled to the second stator 20. Specifically, the shaft 40 is inserted into the guide hole 21$f_2$ and the bearing B, and the end surface 32 of the mover 30 is abutted against the actuation-side stopper part 21*f* (stopper surface 21$f_1$).

Subsequently, the first stator 10 is assembled to the second stator 20 and the coil module 80. Specifically, with the seal member $Sr_2$ arranged at the flange part 81*c*, the cylindrical part 11 is fitted into the cylindrical part 81*a* of the bobbin 81, and the flange part 13 is abutted against the annular recess 23*b*. Then, a crimping process is performed such that the crimping part 23*c* clamps the flange part 13. Accordingly, the first stator 10 is fixed to the second stator 20. Then, the seal member $Sr_3$ is fitted into the annular groove 24*a* of the fitting part 24. On the other hand, the seal member $Sr_3$ may also be fitted in the annular groove 24*a* in advance when preparing the second stator 20. Accordingly, the assembly of the electromagnetic actuator is completed. Nonetheless, the seal member $Sr_3$ may also be fitted into the annular groove 24*a* of the fitting part 24 when the electromagnetic actuator is applied to the application target object.

In this electromagnetic actuator, before being applied to the application target object, the mover module M is movable in the axis S direction between the rest-side stopper part (inner wall surface 12*a*) and the actuation-side stopper part 21*f* (stopper surface $21f_1$). Upon attachment of the electromagnetic actuator to the application target object, the shaft 40 is biased to retreat by the return force of the biasing member provided on the application target object, and as shown in FIG. 4, the protruding part 52 of the rod 50 is held at the rest position abutting against the rest-side stopper part (inner wall surface 12*a*) of the first stator 10.

Figure 13:
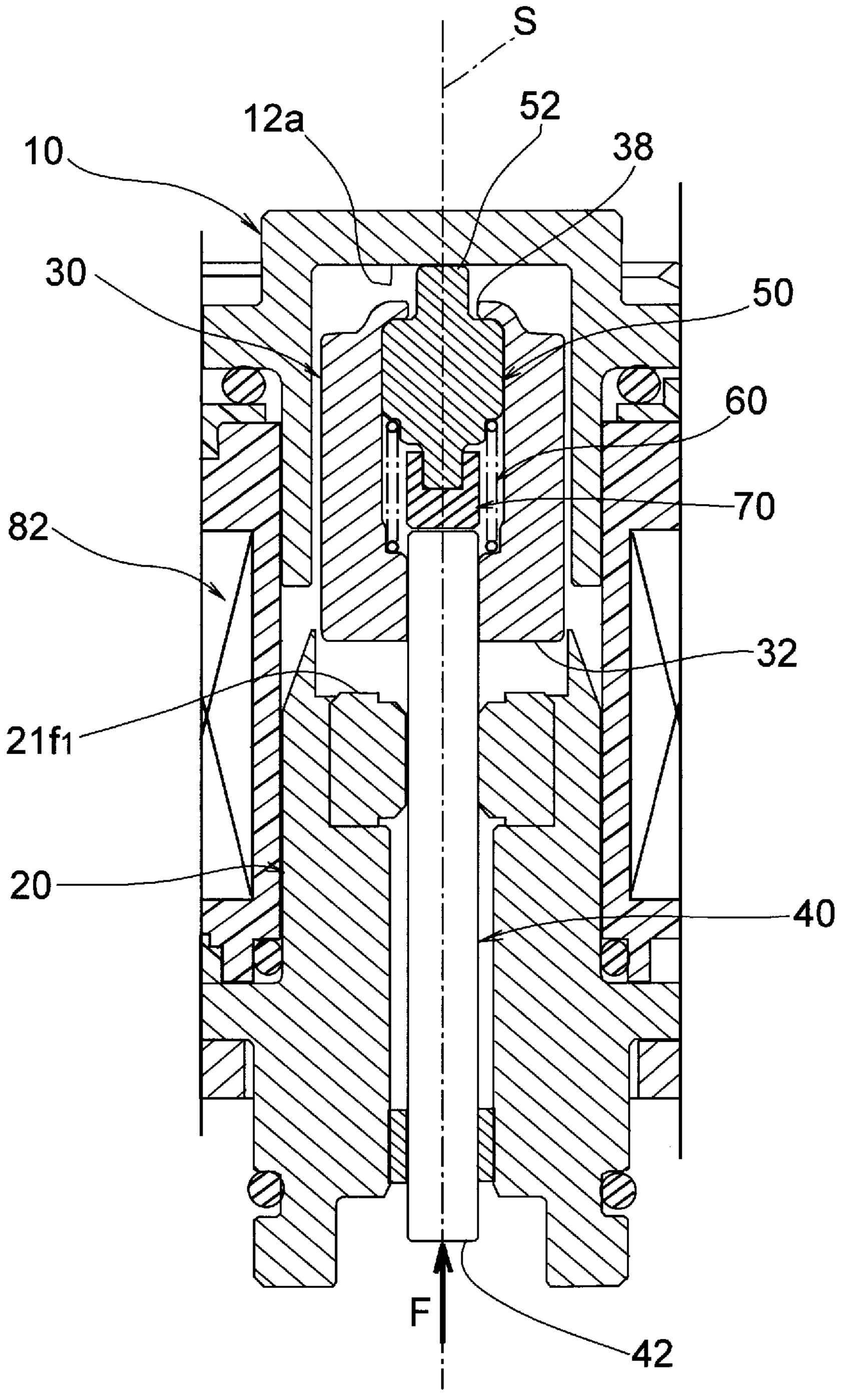
FIG. 13 is a partial cross-sectional view illustrating an operation of the electromagnetic actuator according to the first embodiment, showing a state in which the mover is positioned at the rest position.
Figure 14:
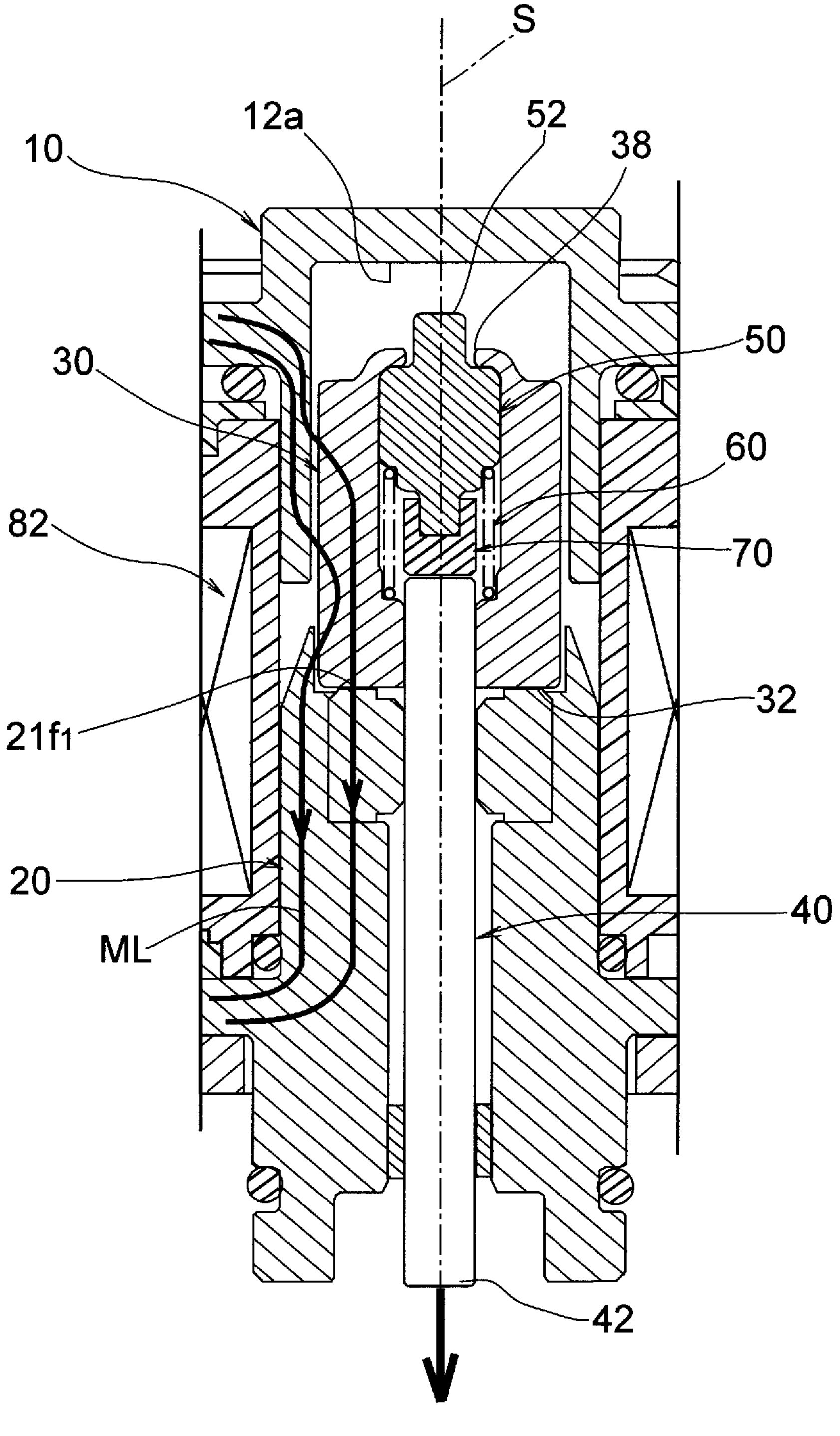
FIG. 14 is a partial cross-sectional view illustrating an operation of the electromagnetic actuator according to the first embodiment, showing a state in which the mover is positioned at an actuation position.
Figure 15:
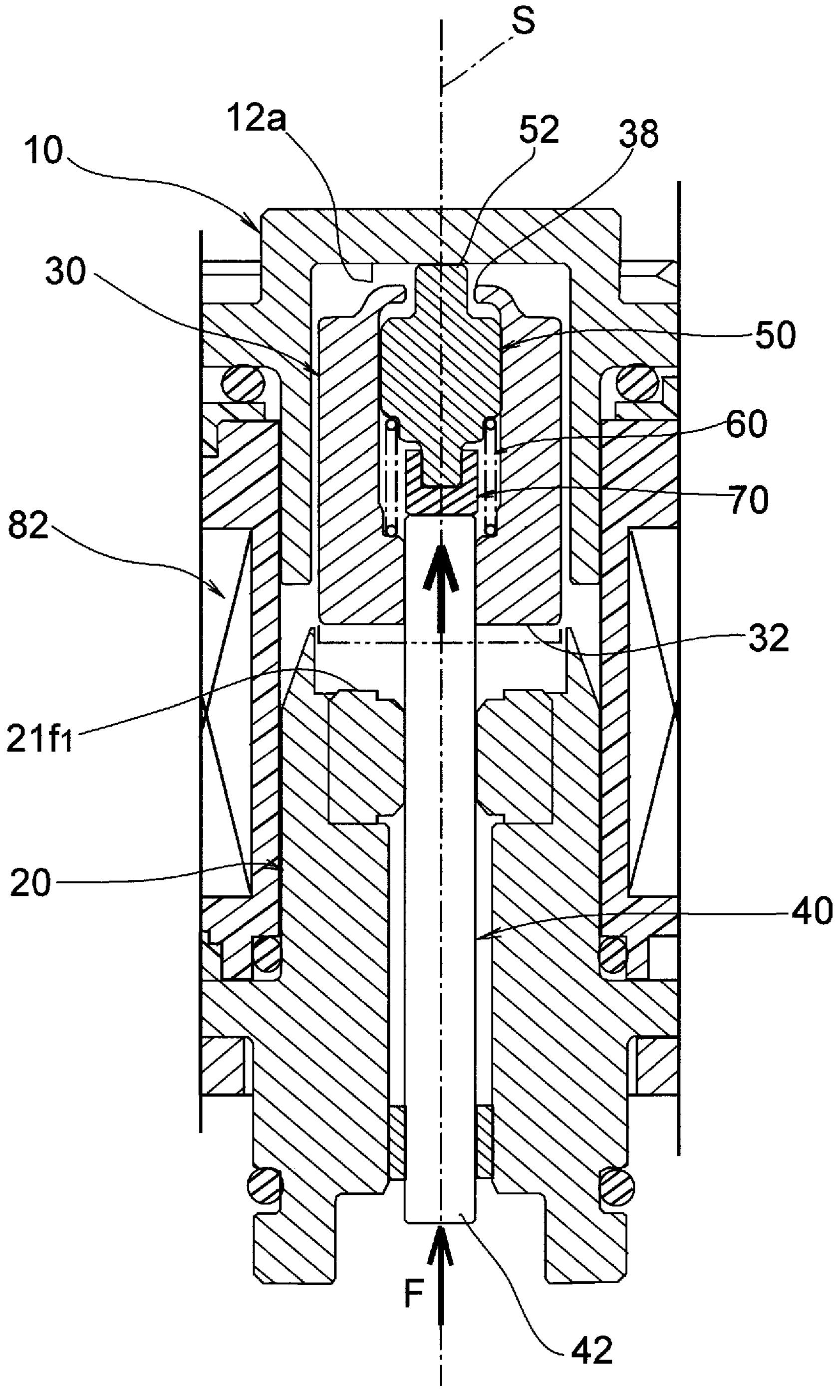
FIG. 15 is a partial cross-sectional view illustrating an operation of the electromagnetic actuator according to the first embodiment, showing a state in which the mover returns from the actuation position to the rest position.

Next, the operation in the state in which the electromagnetic actuator has been applied to the application target object will be described with reference to FIGS. 13 to 15. First, in a non-energized state in which the coil 82 is not energized, as shown in FIG. 13, the shaft 40 and the mover 30 are pushed back by a return force F exerted by the application target object, and the protruding part 52 of the rod 50 is positioned at the rest position abutting against the rest-side stopper part (inner wall surface 12*a*).

In this rest state, upon energization of the coil 82, a magnetic line of force (electromagnetic force) ML is generated to flow from the cylindrical part 11 of the first stator 10 via the mover 30 to the inner cylindrical part 21 of the second stator 20, and the mover 30 is drawn toward the second stator 20. Then, as shown in FIG. 14, the end surface 32 of the mover 30 moves to the actuation position abutting against the actuation-side stopper part (stopper surface $21f_1$) of the second stator 20 and stops, and exerts a driving force on the application target object to perform an operation such as switching.

On the other hand, in this actuation state, upon disconnection of energization of the coil 82, the shaft 40 and the mover 30 are pushed back by the return force F exerted by the application target object, and the mover module M retreats toward the rest position. In this retreat process, first, the protruding part 52 of the rod 50 abuts against the rest-side stopper part (inner wall surface 12*a*), and as shown in FIG. 15, the mover 30 and the shaft 40 move excessively beyond a predetermined rest position (double-dot dashed line in FIG. 15) due to inertia force, and the buffer member 70 is elastically deformed between the rod 50 and the shaft 40. In this movement process, the impact force of the mover 30 which moves integrally with the shaft 40 is absorbed. Then, the mover 30 and the shaft 40 which have moved excessively are pushed back in the opposite direction due to the biasing force of the biasing member 60 and stop at the predetermined rest position, as shown in FIG. 13. Accordingly, with the operation of the buffer unit U (the rod 50, the biasing member 60, and the buffer member 70), the impact force when the mover 30 returns to the rest position is absorbed, and the mover 30 is positioned at the predetermined rest position with high accuracy.

According to the electromagnetic actuator according to the first embodiment, since the mover 30 includes the fitting hole 33 into which the shaft 40 is fitted and the receiving part 34 which receives the biasing member 60, the shaft 40 having a single outer diameter can be adopted as the shaft fixed to the mover 30 without the need to provide a receiving part for the biasing member at the shaft as in the conventional case. Accordingly, simplification of structure and cost reduction of the shaft 40 can be achieved.

In addition, since the mover 30 includes the restricting part 37 which is crimped to restrict the rod 50 from coming off, after accommodating the buffer unit U (the buffer member 70, the biasing member 60, and the rod 50) in the accommodating part C, it is possible to restrict the rod 50 from coming off by simply performing a crimping process, and the assembly work can be easily performed.

Further, a compression-type coil spring is adopted as the biasing member 60, and the mover 30 includes the guide inner wall surface 35 which guides the rod 50 slidably in the axis S direction, and the receiving part 34 which is formed in an annular shape around the fitting hole 33. Thus, the shape of the accommodating part C of the mover 30 can be simplified, which also contributes to cost reduction. In addition, since the mover 30 includes the fitting inner wall surface 36 which is formed continuously with the outer edge of the receiving part 34 and into which the one end part 61 of the biasing member 60 forming a coil spring is fitted, the biasing member 60 can be positioned in a direction perpendicular to the axis S.

Further, by press-fitting the fixed end part 41 of the shaft 40 into the fitting hole 33 to protrude inward (into the accommodating part C) from the receiving part 34 in the axis S direction, the buffer member 70 can be reliably interposed between the end surface 41*a* and the rod 50. Further, by providing the mover 30 as a forged product, it is possible to achieve cost reduction as compared to a machined product. As described above, according to the electromagnetic actuator according to the first embodiment, it is possible to achieve simplification of structure, cost reduction, simplification of assembly work, etc.

Figure 16:
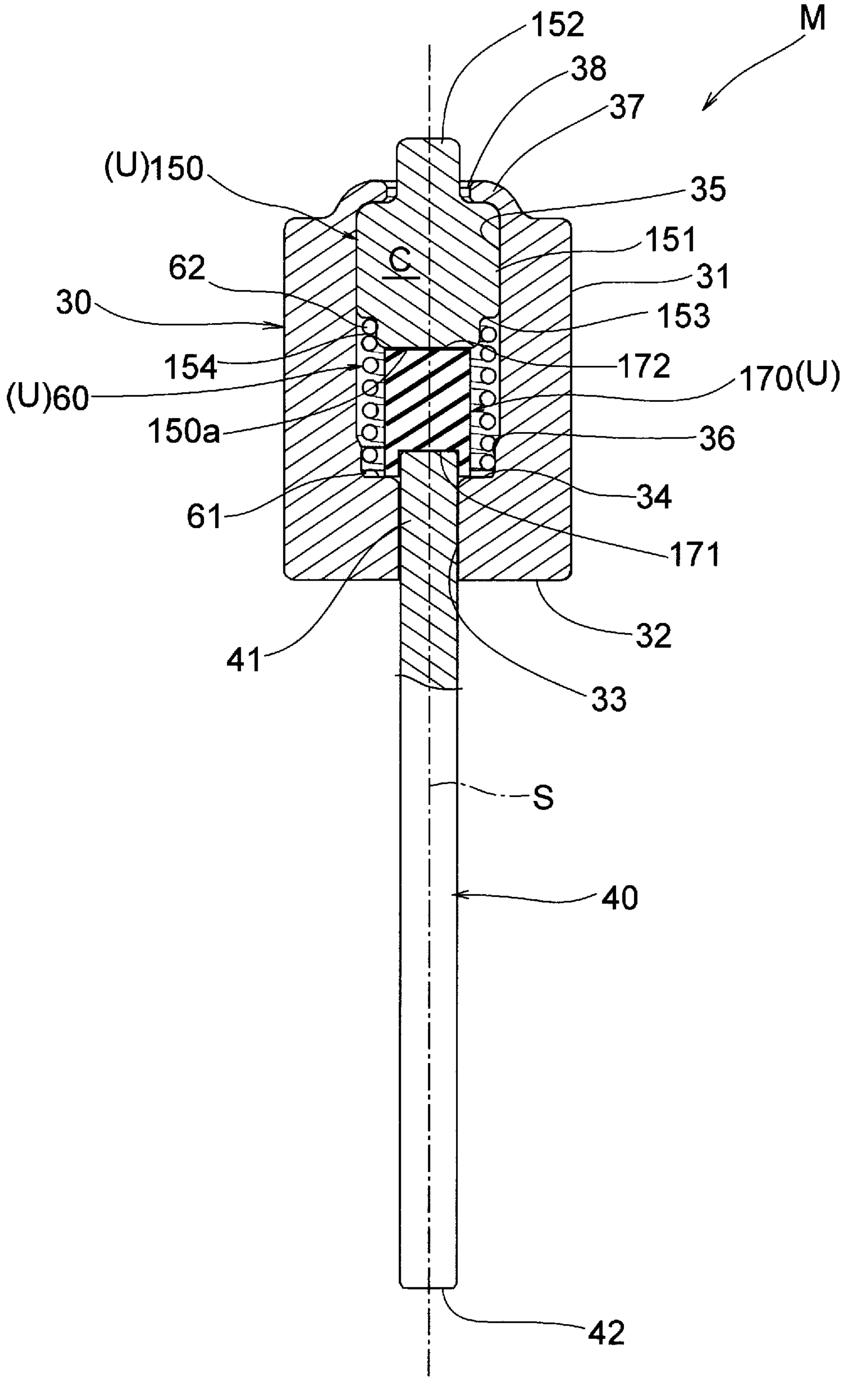
FIG. 16 shows an electromagnetic actuator according to a second embodiment of the disclosure, and is a cross-sectional view of a mover accommodating a buffer unit and a shaft.

FIG. 16 shows an electromagnetic actuator according to a second embodiment of the disclosure, which is similar to the first embodiment except that the shape of the rod 50 and the arrangement of the buffer member 70 in the first embodiment are changed. Thus, in the second embodiment, the same configurations as in the first embodiment will be labeled with the same reference signs, and descriptions thereof will be omitted.

The electromagnetic actuator according to the second embodiment includes a first stator 10 and a second stator 20 as stators, a mover 30, a shaft 40 fixed to the mover 30, a buffer unit U (rod 150, biasing member 60, and buffer member 170), a coil module 80, a flange member 90, and seal members $Sr_1$, $Sr_2$, and $Sr_1$.

The rod 150 is formed of stainless steel or the like and includes a main body part 151, a protruding part 152, a receiving part 153, and a positioning part 154. The main body part 151 is formed in a columnar shape centered on the axis S to slidably contact the guide inner wall surface of the mover 30. The protruding part 152 is formed in a columnar shape that is centered on the axis S and has a diameter smaller than that of the main body part 151 to protrude from the opening 38 of the mover 30 and releasably abut against the rest-side stopper part (inner wall surface 12*a*) of the first stator 10. The receiving part 153 is formed as a ring-shaped end surface centered on the axis S to receive the another end part 62 of the biasing member 60. The positioning part 154 is formed in a columnar shape that is centered on the axis S and has a diameter smaller than that of the main body part 151 to be fitted on the inner side of the biasing member 60 to position the biasing member 60 in a direction perpendicular to the axis S.

The buffer member 170 is formed of a material capable of absorbing impact such as a rubber material into a columnar shape, and includes a fitting recess 171 and an end surface 172. A part of the fixed end part 41 of the shaft 40 is fitted into the fitting recess 171. The end surface 172 is formed as a plane perpendicular to the axis S and abuts against an end surface 150*a* of the rod 150. By fitting the fixed end part 41 of the shaft 40 into the fitting recess 171, the buffer member 170 is positioned in a direction perpendicular to the axis S and is arranged such that the end surface 172 is opposed to the end surface 150*a*. According to the electromagnetic actuator according to the second embodiment, similar to the first embodiment, it is possible to achieve simplification of structure, cost reduction, simplification of assembly work, etc.

In the above-described embodiments, the biasing member 60 forming a coil spring has been adopted as the biasing member included in the buffer unit U, but the disclosure is not limited thereto, and a multi-turn wave spring laminated with a plurality of waveform plate springs or a biasing member having another form may also be adopted. In the above-described embodiments, the restricting part 37 which is crimped has been shown as the restricting part for restricting the rods 50 and 150 accommodated in the mover 30 from coming off, but the disclosure is not limited thereto, and a restricting part having another form may also be adopted. In the above-described embodiments, the first stator 10 and the second stator 20 have shown as the stators, but a first stator and a second stator having other forms may also be adopted. In the above-described embodiments, the return force exerted by the application target object has been applied as the return force for returning the mover 30 to the rest position, but the disclosure is not limited thereto, and a biasing member (e.g., a coil spring) that generates a return force may also be incorporated in the electromagnetic actuator.

As described above, since the electromagnetic actuator of the disclosure can achieve simplification of structure, cost reduction, and simplification of assembly work, it is applicable not only to switching operations of various switching mechanisms related to engines or vehicles, but is also useful in switching mechanisms in other fields.

What is claimed is:

1. An electromagnetic actuator comprising:

a stator;

a coil for excitation;

a mover which moves in a predetermined axial direction to move to an actuation position due to energization of the coil and return to a rest position due to non-energization of the coil;

a shaft of a single outer diameter which is fixed to the mover and exerts a driving force to outside; and a buffer unit which is held at the mover and positions the mover at the rest position while absorbing impact when the mover returns to the rest position, wherein the buffer unit comprises: a rod which abuts against the stator at the rest position; a biasing member which biases the rod toward the stator; and a buffer member which is interposed between the rod and the shaft, and the mover comprises a restricting part, a fitting hole, a guide inner wall surface and a receiving part, the restricting part is crimped to restrict the rod from coming off, the shaft is fitted into the fitting hole, wherein the guide inner wall surface guides the rod slidably in the axial direction, and the guide inner wall surface is formed to have a diameter larger than a diameter of the fitting hole, wherein the receiving part is formed in an annular shape around the fitting hole and receives one end part of the biasing member in the axial direction, and the receiving part is formed to have an outer diameter larger than a diameter of the fitting hole.

2. The electromagnetic actuator according to claim 1, wherein the biasing member is a compression-type coil spring.

3. The electromagnetic actuator according to claim 2, wherein the mover comprises a fitting inner wall surface which is formed continuously with an outer edge of the receiving part and into which one end part of the coil spring is fitted.

4. The electromagnetic actuator according to claim 2, wherein the shaft is press-fitted into the fitting hole such that a fixed end part of the shaft protrudes inward from the receiving part in the axial direction.

5. The electromagnetic actuator according to claim 1, wherein the mover is a forged product.

6. The electromagnetic actuator according to claim 1, wherein the stator comprises:

a first stator which comprises a rest-side stopper part abutting against the rod and accommodates the mover; and a second stator comprising a through-hole which allows the shaft to pass and exposes a free end part of the shaft.

7. The electromagnetic actuator according to claim 6, wherein the first stator comprises: a cylindrical part which accommodates the mover in a non-contact manner; a bottom wall part which is continuous with the cylindrical part to define the rest-side stopper part; and a flange part which extends in a radial direction from the cylindrical part, and the second stator comprises: an inner cylindrical part which defines the through-hole; and an outer cylindrical part which surrounds the coil arranged around the cylindrical part and the inner cylindrical part and fixes the flange part by crimping.

8. The electromagnetic actuator according to claim 7, wherein the second stator comprises an actuation-side stopper part which receives the mover at the actuation position.

9. The electromagnetic actuator according to claim 8, wherein the actuation-side stopper part is subjected to a hardening treatment.

10. The electromagnetic actuator according to claim 8, wherein the actuation-side stopper part comprises a guide hole which slidably guides the shaft.

11. The electromagnetic actuator according to claim 10, wherein the second stator comprises a bearing which is fitted to the through-hole to slidably guide the shaft.

* * * * *